(12) United States Patent
Li et al.

(10) Patent No.: US 7,561,414 B2
(45) Date of Patent: Jul. 14, 2009

(54) DISPLAY HEIGHT ADJUSTING DEVICE, AND PORTABLE COMPUTER AND DISPLAY HAVING THE DISPLAY HEIGHT ADJUSTING DEVICE

(75) Inventors: Chen-Yu Li, Taipei Hsien (TW); Hsing-Wang Chang, Taipei Hsien (TW); Feng-Hsiung Wu, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 196 days.

(21) Appl. No.: 11/879,127

(22) Filed: Jul. 16, 2007

(65) Prior Publication Data
US 2008/0137273 A1 Jun. 12, 2008

(30) Foreign Application Priority Data
Dec. 8, 2006 (TW) .............................. 95221680 U (51) Int. Cl.
*G06F 1/16* (2006.01)
(52) U.S. Cl. ............................ 361/679.26; 361/679.55; 248/617
(58) Field of Classification Search ............ 361/679.21, 361/679.26, 679.55; 312/319.6; 248/917–921
See application file for complete search history.

(56) References Cited

U.S. PATENT DOCUMENTS

| | | | | |
|---|---|---|---|---|
| 6,134,103 | A * | 10/2000 | Ghanma | 361/679.05 |
| 6,233,138 | B1 * | 5/2001 | Osgood | 361/679.05 |
| 6,381,128 | B1 * | 4/2002 | Kramer | 361/679.55 |
| 6,796,537 | B1 * | 9/2004 | Lin | 248/917 |
| 7,168,665 | B2 * | 1/2007 | Hong et al. | 248/917 |
| 7,239,506 | B2 * | 7/2007 | Ogawa et al. | 361/679.22 |
| 7,400,498 | B2 * | 7/2008 | Liang et al. | 361/679.55 |
| 7,492,580 | B2 * | 2/2009 | Lee | 248/917 |
| 2004/0125549 | A1 * | 7/2004 | Iredale | 248/917 |
| 2006/0108900 | A1 * | 5/2006 | Lee | 312/319.6 |
| 2006/0176654 | A1 * | 8/2006 | Kfoury | 361/681 |
| 2006/0291149 | A1 * | 12/2006 | Suzuki et al. | 361/681 |

* cited by examiner

*Primary Examiner*—Lisa Lea-Edmonds
(74) *Attorney, Agent, or Firm*—The Webb Law Firm (57) ABSTRACT

A display height adjusting device is disposed to be mounted in a display. Through a pair of intersecting sliding support members, which have top ends connected slidably and pivotally to a rear face of the display and bottom ends connected slidably and pivotally to a support frame, the display height adjusting device permits the display to move up and down relative to the support frame by means of the two sliding support members. The sliding support members also have the function of augmenting the height to which the display can be elevated.

21 Claims, 9 Drawing Sheets

DISPLAY HEIGHT ADJUSTING DEVICE, AND PORTABLE COMPUTER AND DISPLAY HAVING THE DISPLAY HEIGHT ADJUSTING DEVICE

CROSS-REFERENCE TO RELATED APPLICATION

This application claims priority of Taiwanese Application No. 095221680, filed on Dec. 8, 2006.

BACKGROUND OF THE INVENTION

1. Field of the Invention

The invention relates to a height adjusting device, a portable computer, and a display, more particularly to a display height adjusting device, and a portable computer and a display respectively having the display height adjusting device.

2. Description of the Related Art

In a conventional notebook computer, a display and a computing device of the notebook computer are interconnected by a hinge. That is, a pivot shaft is provided between the display and the computing device to permit adjustment of an elevational angle of the display by pivotally turning the display relative to the computing device.

However, sometimes there is a height difference between the eye level and the screen of the display, so that the user cannot see the screen comfortably. If the height difference is small, a suitable viewing angle can be achieved by simply adjusting the elevational angle of the display. Where the height difference is large, the user needs to adjust his/her sitting posture or the height of the seat on which he/she is seated, or to raise the notebook computer by placing a book between the notebook computer and the desk surface so as to lower the height difference, which is very inconvenient.

Figure 1:
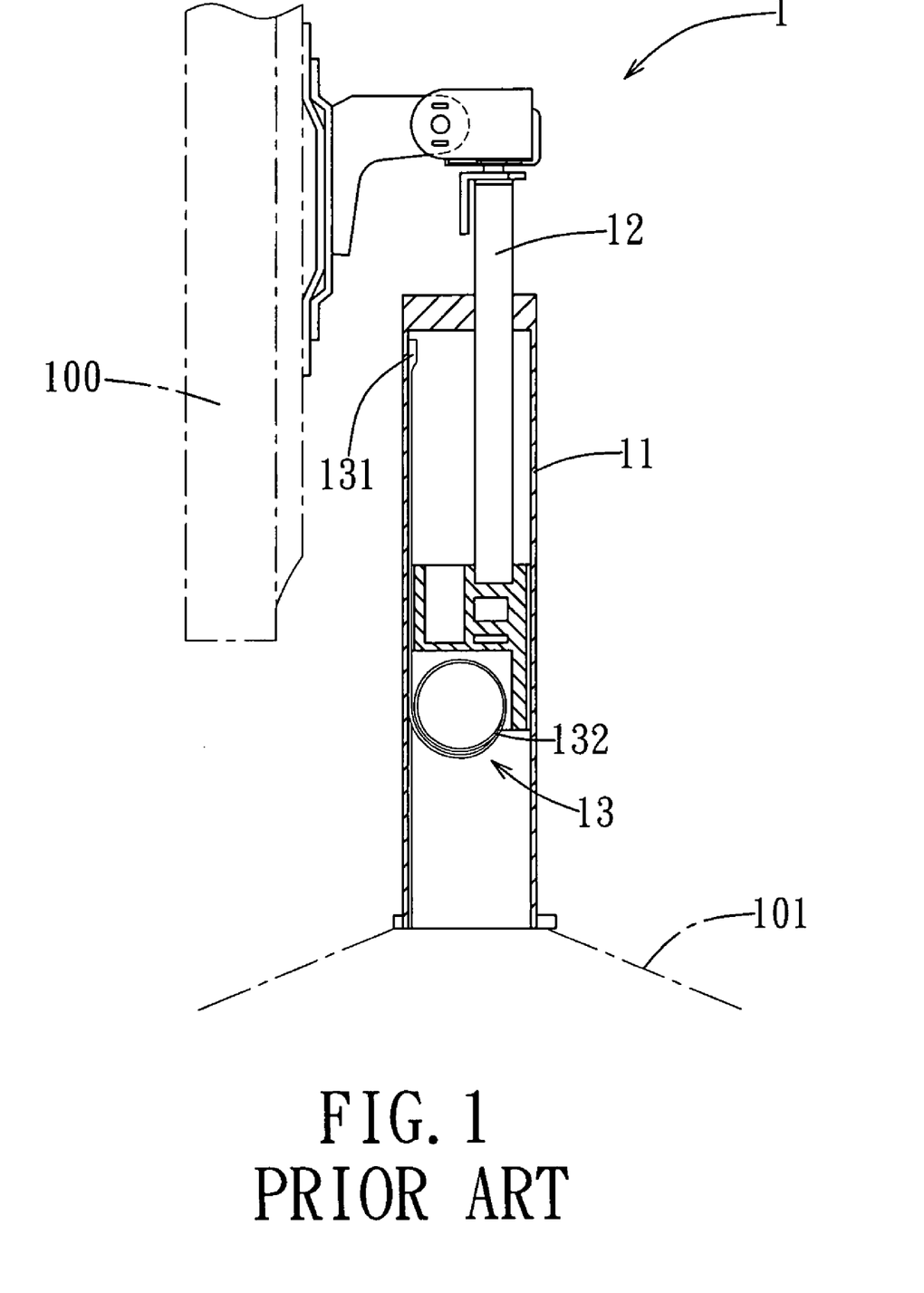
FIG. 1 is a partly sectional side view of a conventional support device for a display.

FIG. 1 shows a conventional support device 1 for use in a desk-top display. The support device 1 includes a support member 11, a sliding member 12 extending through the support member 11 and slidable up and down relative to the support member 11, and a constant force spring 13. The support member 11 has a bottom end for mounting on a base 101. The sliding member 12 has a top end for mounting of a display 100. The constant force spring 13 has a top end 131 secured in the support member 11, and a coiled portion 132 at a bottom end which abuts against a bottom end of the sliding member 12. When the sliding member 12 is elevated or lowered relative to the support member 11, the coiled portion 132 of the constant force spring 13 curls upward or is stretched downward. Through the arrangement of the constant force spring 13, the sliding member 12 can be positioned at an arbitrary height. Thus, the position of the display 100 can be adjusted freely through the extension or retraction of the sliding member 12 relative to the support member 11. However, the conventional support device 1 is relatively bulky, and is therefore not suitable for use in notebook computers, which are required to be compact and light.

Figure 2:
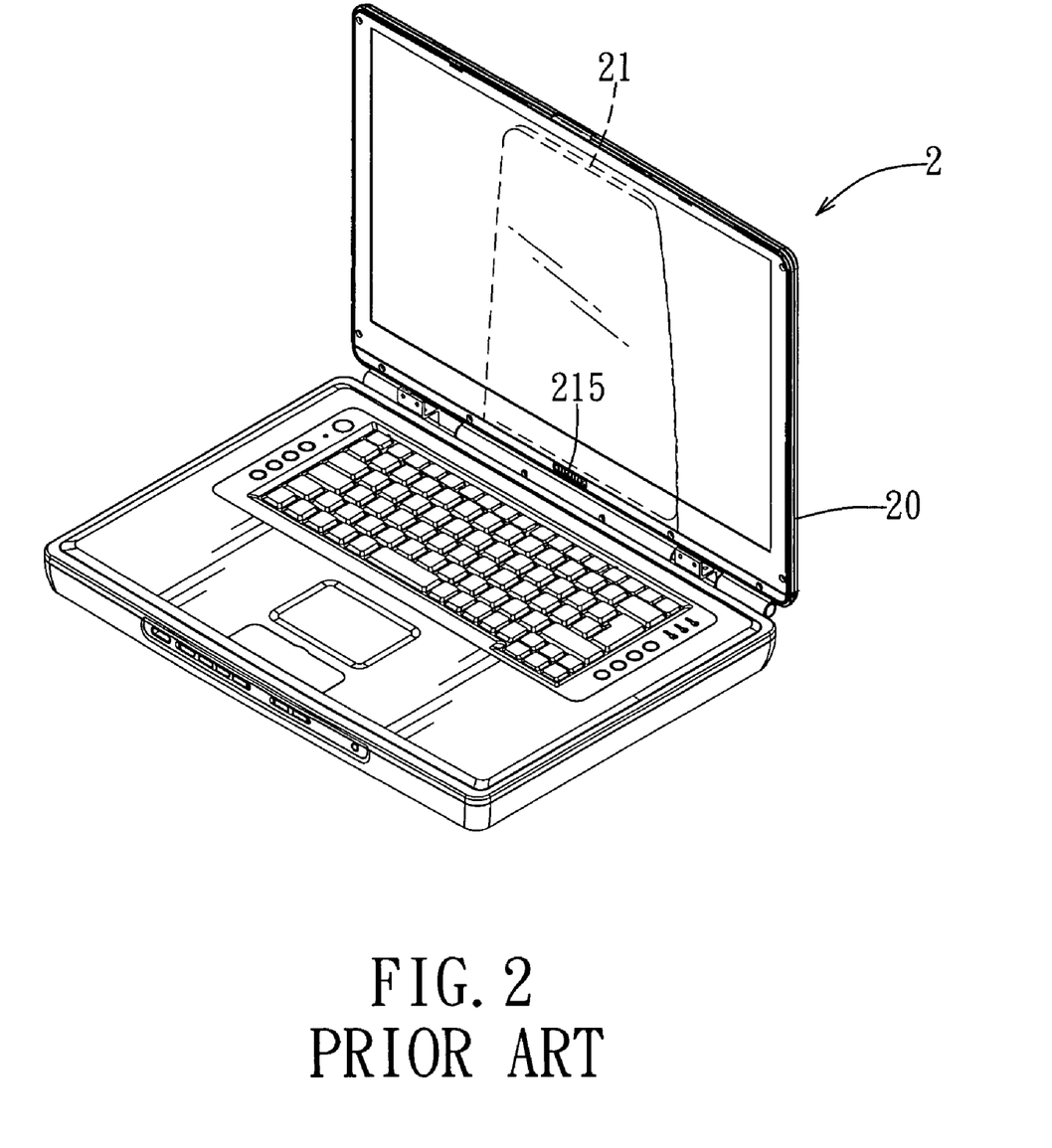
FIG. 2 is a perspective view of a conventional display height adjusting device when incorporated in a notebook computer.
Figure 3:
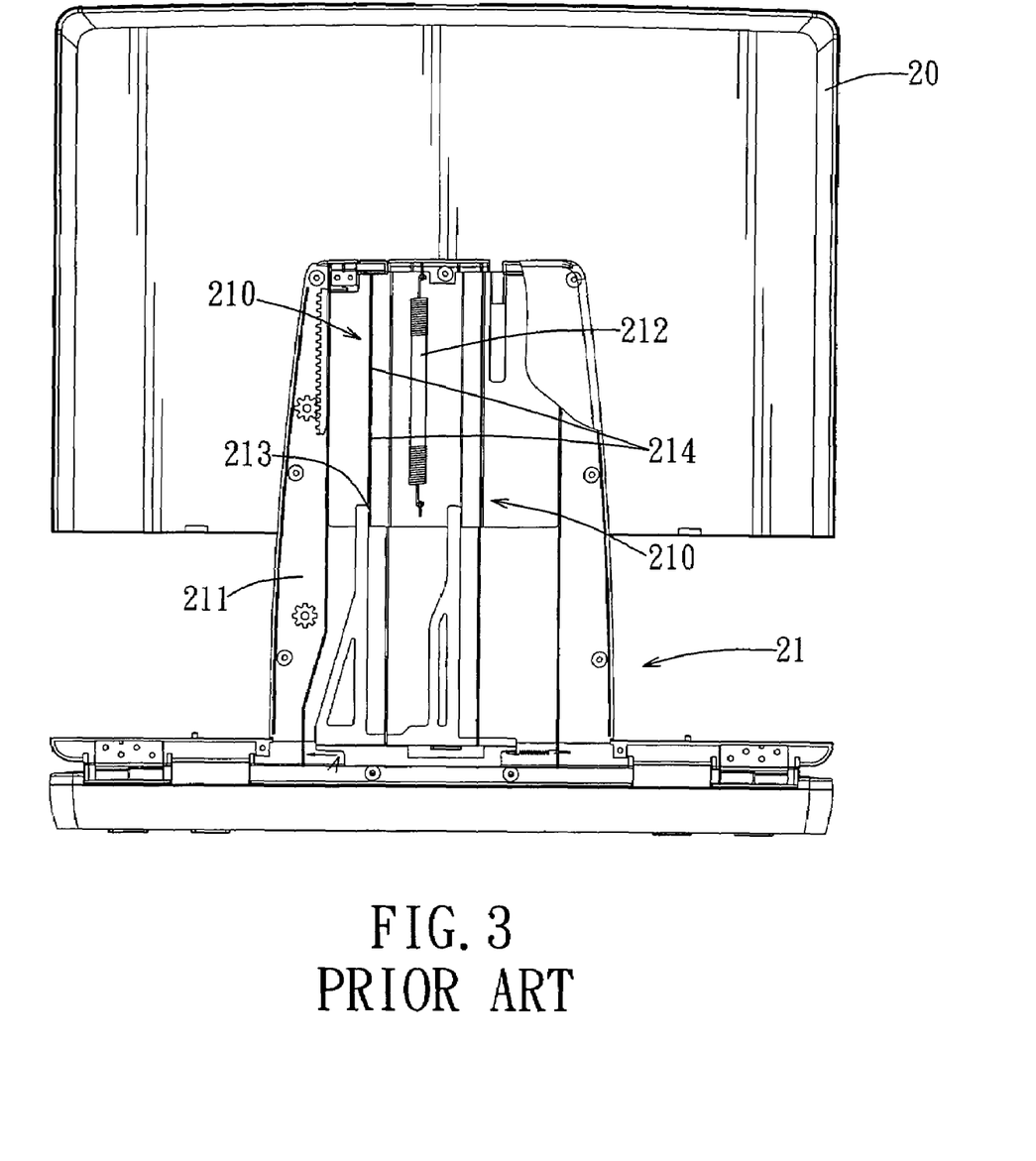
FIG. 3 is a rear view of the conventional display height adjusting device of FIG. 2.

FIGS. 2 and 3 show a notebook computer display height adjusting device disclosed in R.O.C. Patent No. 251168. An adjusting device 21 as disclosed therein includes a supporting back plate 211 disposed on a rear face of a display 20 of a notebook computer 2, and a spring 212 with a top end connected to a top portion of the supporting back plate 211, and a bottom end connected to a bottom portion of the display 20. Slide groove structures 210 with a guiding function are provided between the rear face of the display 20 and the supporting back plate 211. Thus, the display 20 can be slid upward relative to the supporting back plate 211 by virtue of a resilient restoring action of the spring 212. In addition, the supporting back plate 211 is provided with fasteners 213, and the display 20 has a plurality of fastening holes 214 spaced apart in an up-and-down relationship in the rear face thereof for engaging the fasteners 213. A slide switch 215 is further provided on a front side of the display 20 and is connected to the fasteners 213. When the user needs to adjust the height of the display 20 relative to the notebook computer 2, he/she can manipulate the slide switch 215 to cause the fasteners 213 to disengage laterally from the corresponding fastening holes 214. Through the resilient restoring action of the spring 212, the display 20 can be elevated. Through engagement of the fasteners 213 with the fastening holes 214 at the corresponding height position, the display 20 can be positioned at the desired height.

However, as such a display height adjusting device achieves the function of elevation by means of the slide groove structures 210 between the rear face of the display 20 and the supporting back plate 211, the height to which the display 20 can be elevated is directly limited by the height of the slide groove structures 210. With the current trend of notebook computer products toward smaller and smaller sizes, the height at which the slide groove structures 210 can be disposed is relatively low. Consequently, the height to which the display 20 can be elevated is limited, and is not practically significant.

SUMMARY OF THE INVENTION

Therefore, an object of the present invention is to provide a display height adjusting device that has a construction different from that of the prior art.

Another object of the present invention is to provide a display height adjusting device capable of augmenting the height to which a display can be elevated.

Still another object of the present invention is to provide a portable computer having a display height adjusting device to permit adjustment of the height position of a display.

Yet another object of the present invention is to provide a display having a display height adjusting device to permit adjustment of the height position of the display.

Accordingly, a display height adjusting device of the present invention includes a rear casing, a support frame, a sliding frame, and two sliding support members.

The rear casing is mounted on a rear face of a display, and has a bottom portion connected pivotally to a computing device, and a front face spaced apart from the rear face of the display. The support frame is disposed in front of the rear casing, and has a first left side portion and a first right side portion. The sliding frame is in the form of a plate, is disposed on the rear face of the display, and has a second left side portion and a second right side portion. The two sliding support members intersect each other. Each of the sliding support members has a top end and a bottom end. The bottom ends of the two sliding support members are connected slidably and respectively to the first left side portion and the first right side portion. The top ends of the two sliding support members are connected slidably and respectively to the second left side portion and the second right side portion. Thus, the sliding frame is capable of bringing the top and bottom ends of the two sliding support members to move therewith so as to enable the display to slide up and down relative to the sliding frame and the support frame.

A portable computer of the present invention includes a computing device, a display, and a display height adjusting device disposed between the computing device and the display. The display height adjusting device includes a rear casing, a support frame, a sliding frame, and two sliding support members.

The rear casing is mounted on a rear face of the display, and has a bottom portion connected pivotally to the computing device, and a front face spaced apart from the rear face of the display. The support frame is disposed in front of the rear casing, and has a first left side portion and a first right side portion. The sliding frame is in the form of a plate, is disposed on the rear face of the display, and has a second left side portion and a second right side portion. The two sliding support members intersect each other. Each of the sliding support members has a top end and a bottom end. The bottom ends of the two sliding support members are slidable laterally and are connected slidably and respectively to the first left side portion and the first right side portion. The top ends of the two sliding support members are slidable laterally and are connected slidably and respectively to the second left side portion and the second right side portion. Thus, the sliding frame is capable of bringing the top and bottom ends of the two sliding support members to move therewith so as to enable the display to slide up and down relative to the sliding frame and the support frame and to thereby move up and down relative to the rear casing.

The display of the present invention includes a base, a face panel module, and a display height adjusting device disposed between the base and the face panel module. The display height adjusting device includes a rear casing, a support frame, a sliding frame, and two sliding support members.

The rear casing is mounted on a rear face of the face panel module, and has a bottom portion connected pivotally to the base, and a front face spaced apart from the rear face of the face panel module. The support frame is disposed in front of the rear casing, and has a first left side portion and a first right side portion. The sliding frame is in the form of a plate, is disposed on the rear face of the face panel module, and has a second left side portion and a second right side portion. The two sliding support members intersect each other. Each of the sliding support members has a top end and a bottom end. The bottom ends of the two sliding support members are slidable transversely and are connected slidably and respectively to the first left side portion and the first right side portion. The top ends of the two sliding support members are slidable laterally and are connected slidably and respectively to the second left side portion and the second right side portion. Thus, the sliding frame is capable of bringing the top and bottom ends of the two sliding support members to move therewith so as to enable the face panel module to slide up and down relative to the sliding frame and the support frame and to thereby move up and down relative to the rear casing.

The display height adjusting device of the present invention further includes a positioning mechanism. The positioning mechanism includes a pair of first positioning members, a pair of second positioning members, a driven plate member, and a press member. The first positioning members are spacedly disposed on the sliding frame. Each of the second positioning members has a plurality of positioning portions that are arranged in an up and down relationship. The two second positioning members are disposed on the front face of the rear casing relative to upper portions of the first left and right side portions of the support frame, with the positioning portions thereof disposed adjacent to the first positioning members, respectively. Each of the second positioning members can be forced to move away from the respective one of the first positioning members. The driven plate member is displaceable upwardly and downwardly, and is disposed between the front face of the rear casing and the two second positioning members. Two opposite sides of the driven plate member overlap partly and respectively with the two second positioning members. The driven plate member has two oblique guiding slots disposed respectively in portions where the driven plate member overlaps with the two second positioning members. The two oblique guiding slots have top ends proximate to each other and bottom ends remote from each other. Each of the second positioning members further has a guiding key that extends into a respective one of the oblique guiding slots. The press member is disposed resiliently on the rear casing, and corresponds to an upper portion of the driven plate member. The driven plate member can be actuated to displace downward through pressing of the press member.

When each of the second positioning members is adjacent to the respective one of the first positioning members, each of the first positioning members engages one of the positioning portions of the respective one of the second positioning members at a corresponding height, and the guiding keys of the two second positioning members are located respectively at the bottom ends of the two oblique guiding slots in the driven plate member, thereby positioning the sliding frame at a desired height. When a top end of the driven plate member is subjected to a force to displace downward, the guiding keys of the two second positioning members are forced to slide respectively to the top ends of the two oblique guiding slots so that the two second positioning members are caused to move toward each other to permit disengagement of the positioning portions thereof from the first positioning members, thereby enabling the sliding frame to move up and down relative to the support frame.

In the display height adjusting device of the present invention, each of the second left and right side portions has a lateral slide slot. The top ends of the two sliding support members are connected slidably and respectively to the lateral slide slots. Each of the first left side portion and the first right side portion has an oblique slide slot. The two oblique slide slots are symmetrical, and have top ends proximate to each other and bottom ends remote from each other. The bottom ends of the two sliding support members are connected slidably and respectively to the two oblique slide slots.

In the display height adjusting device of the present invention, each of the first positioning members has a hook-shaped top end. The positioning portions of each of the second positioning members are in the form of serrations for engaging the hook-shaped top end of the corresponding one of the first positioning members.

The display height adjusting device of the present invention utilizes two sliding support members to be connected slidably between the sliding frame and the support frame to thereby constitute a sliding mechanism. Furthermore, through the cooperation between the first and second positioning members, the elevation of the display relative to the computing device can be adjusted, and the display can be thus positioned. Besides, the two sliding support members have the function of augmenting the height to which the display can be elevated.

BRIEF DESCRIPTION OF THE DRAWINGS

Other features and advantages of the present invention will be come apparent in the following detailed description of the preferred embodiment with reference to the accompanying drawings, of which.

DETAILED DESCRIPTION OF THE PREFERRED EMBODIMENT

Figure 4:
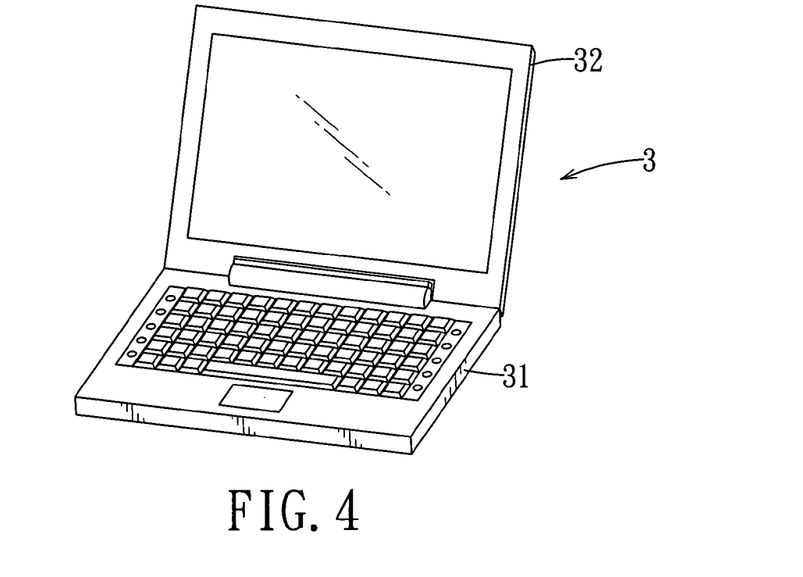
FIG. 4 is a perspective view to illustrate a preferred embodiment of a display height adjusting device according to the invention when incorporated in a notebook computer.
Figure 5:
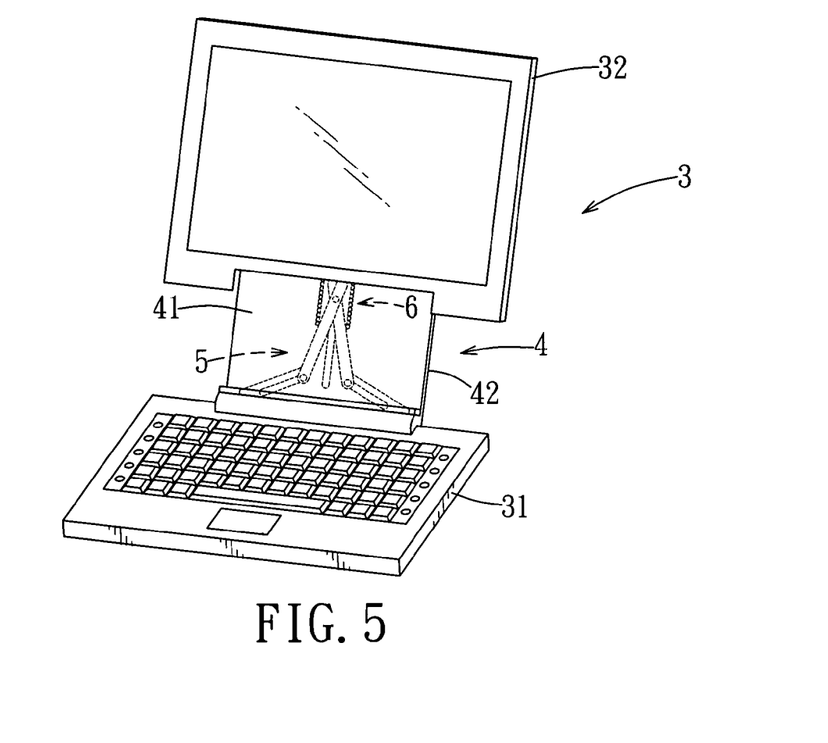
FIG. 5 is a perspective view of the preferred embodiment showing a display of the notebook computer in an elevated state.

Referring to FIGS. 4 and 5, the preferred embodiment of a display height adjusting device 4 according to the present invention is disposed on a portable computer (which is exemplified herein as a notebook computer 3). The notebook computer 3 includes a computing device 31 and a display 32 connected to one side of the computing device 31.

Figure 6:
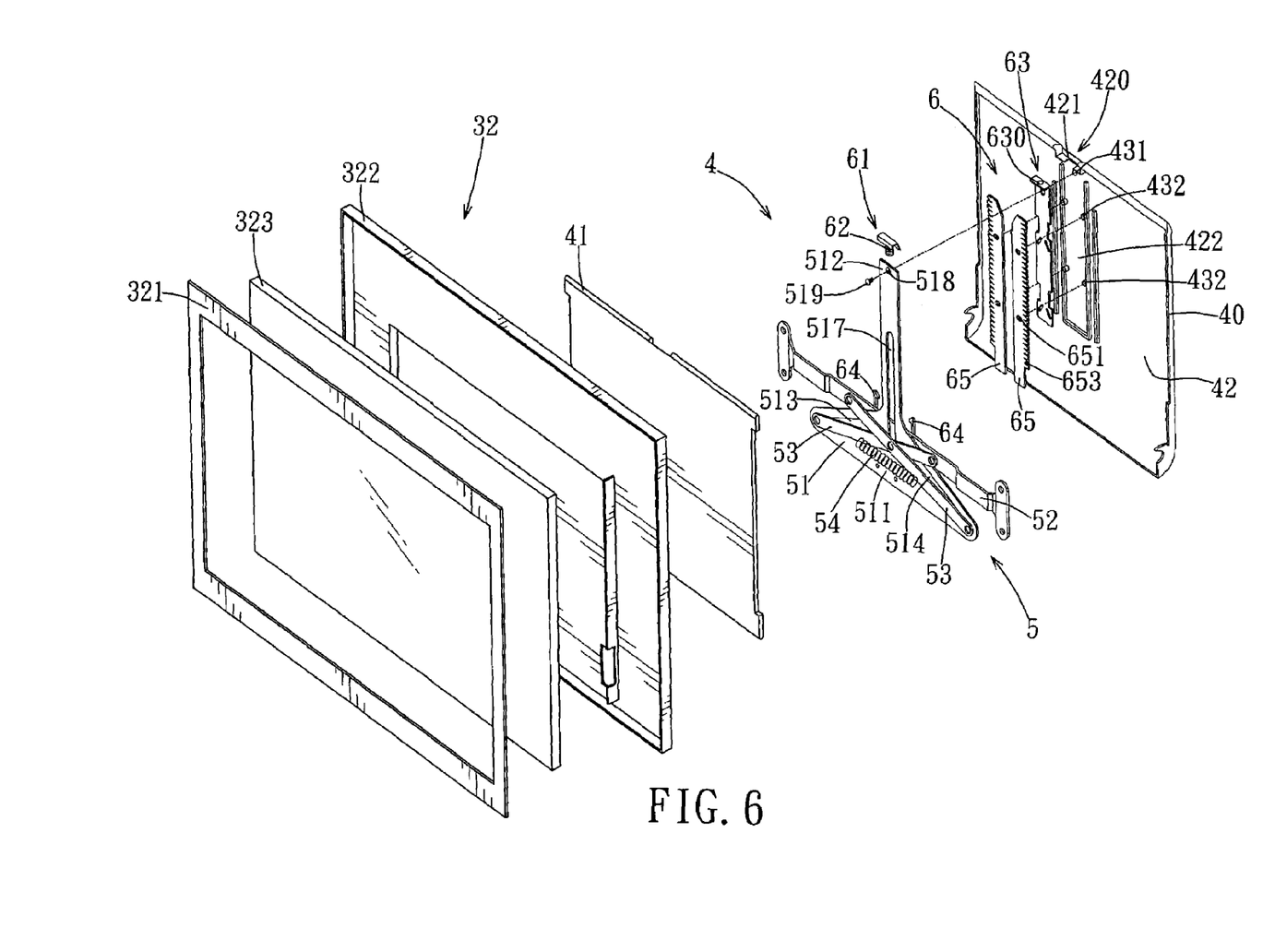
FIG. 6 is an exploded perspective view of the preferred embodiment in part.

Referring to FIGS. 5 and 6, the display 32 includes a front frame 321, a face panel frame 322, and a face panel module 323 disposed between the front frame 321 and the face panel frame 322.

The display height adjusting device 4 includes a front plate 41 and a rear casing 40 that are assembled together to be disposed on a rear face of the display 32, and an height adjusting mechanism 5 and a positioning mechanism 6 disposed between the front plate 41 and the rear casing 40. The rear casing 40 has a bottom portion connected pivotally to a rear edge of the computing device 31, and has a casing front face 42 confronting a rear face of the front plate 41.

The rear casing 40 has a top edge formed with a recessed receiving portion 420 in the middle thereof. The recessed receiving portion 420 has a bottom wall 421, which has a central through portion. A U-shaped rib is disposed on the front face 42 below the recessed receiving portion 420 to define a rectangular region 422. An internally threaded positioning hole 431 is provided in the rectangular region 422 below the recessed receiving portion 420. Internally threaded positioning holes 432 are also provided in each of left and right sides of the rectangular region 422 in an up-and-down relationship.

Figure 7:
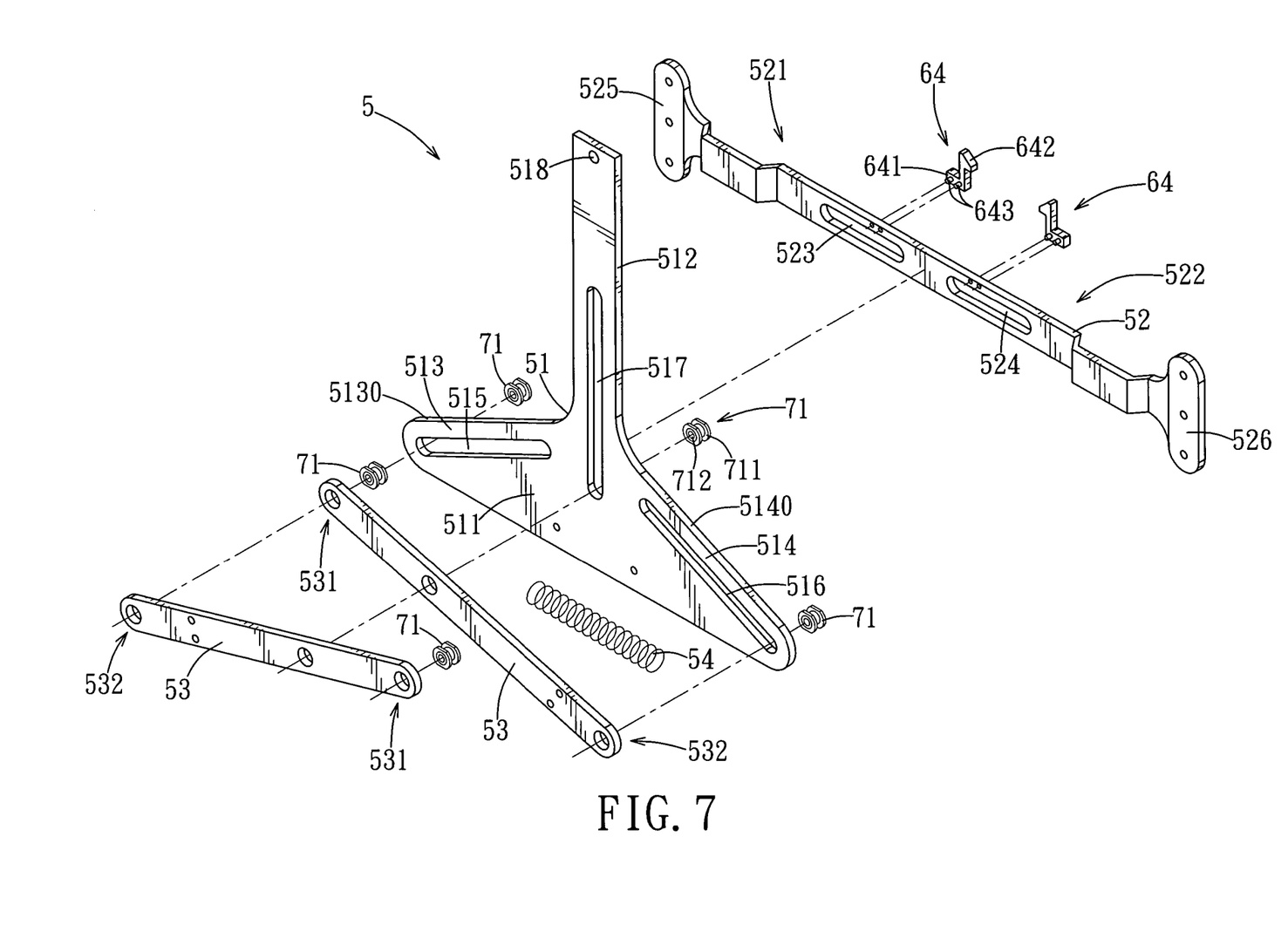
FIG. 7 is an exploded perspective view of a height adjusting mechanism of the preferred embodiment.

Referring to FIGS. 6 and 7, the height adjusting mechanism 5 includes a support frame 51, a sliding frame 52, and two sliding support members 53 which are all in the form of plates, and an extension spring 54. In this embodiment, the support frame 51, the sliding frame 52, and the sliding support members 53 are formed from a metal material.

The support frame 51 includes a triangular base plate 511 and an extension portion 512 extending vertically upward from a tip portion of the triangular base plate 511 in the form of an elongated strip. The base plate 511 includes a first left side portion 513 and a first right side portion 514 that are symmetrical to each other. Each of the first left and right side portions 513, 514 has a top oblique edge 5130, 5140, a bottom edge connected to that of the other of the first left and right side portions 513, 514, and an oblique slide slot 515, 516 formed adjacent to the top oblique edge 5130, 5140. The oblique slide slots 515, 516 have top ends proximate to each other, and bottom ends remote from each other. The extension portion 512 has a longitudinally extending longitudinal slide slot 517, and a through hole 518 adjacent to a top end thereof. The base plate 511 of the support frame 51 is screwed fixedly to the front face 42 of the rear casing 40 adjacent to a bottom edge of the rear casing 40, which is pivoted to the computing device 31 (see FIG. 5), using two screws passing through the two side portions 513, 514 adjacent to the bottom edges thereof. The extension portion 512 is fastened to the front face 42 using a fastener 519 (such as a screw) that passes through the through hole 518 and the positioning hole 431.

The sliding frame 52 is in the form of a lateral plate, which is mounted between the support frame 51 and the rear casing 40. The sliding frame 52 has a second left side portion 521 and a second right side portion 522 which are symmetrical to each other. The second left and right side portions 521, 522 respectively have lateral slide slots 523, 524 that are disposed adjacent to each other, and a respective locking piece 525, 526 formed at a distal end thereof. The locking pieces 525, 526 of the sliding frame 52 are fastened to two sides of a rear face of the face panel frame 322 of the display 32.

The two sliding support members 53 are both in the form of an elongate plate, and are mounted on a front face of the support frame 51. Each sliding support member 53 has a top end 531 and a bottom end 532. The two sliding support members 53 are arranged in a cross shape, and are pivoted to the longitudinal slide slot 517 in the support frame 51 using a pivot pin 71 extending therethrough at the intersection. The top ends 531 of the two sliding support members 53 are mounted slidably in the two lateral slide slots 523, 524 in the sliding frame 52 using a respective pivot pin 71. The bottom ends 532 of the two sliding support members 53 are also mounted slidably in the two oblique slide slots 515, 516 in the support frame 51 using a respective pivot pin 71. Thus, the sliding frame 52 is displaceable up and down relative to the support frame 51 through slidable coupling of the top and bottom ends 531, 532 of the two sliding support members 53 with the lateral slide slots, 523, 524 and the oblique slide slots 515, 516 in the support frame 51. Two ends of the extension spring 54 are connected respectively to the bottom ends 532 of the two sliding support members 53.

It is noted that each of the pivot pins 71 for pivotally connecting the two sliding support members 53 with the lateral slide slots 523, 524, the oblique slide slots 515, 516, and the longitudinal slide slot 517 is in the form of a generally elliptical post, with an annular insert groove 711 formed in an outer peripheral surface thereof, and is to be inserted into a corresponding one of the lateral slide slots 523, 524, the oblique slide slots 515, 516, and the longitudinal slide slot 517, such that the pivot pins 71 can not only displace slidably in the aforesaid slide slots but also rotate about the respective centers thereof. Each of the pivot pins 71 is centrally provided with an internally threaded hole 712 such that a screw extended through the corresponding sliding support member 53 is locked into the respective one of the pivot pins 71, thereby achieving a slidable connection among the sliding support member 53, the support frame 51 and the sliding frame 52. All of the pivot pins 71 are formed from POM (plastic over molded) plastic steel material.

Figure 8:
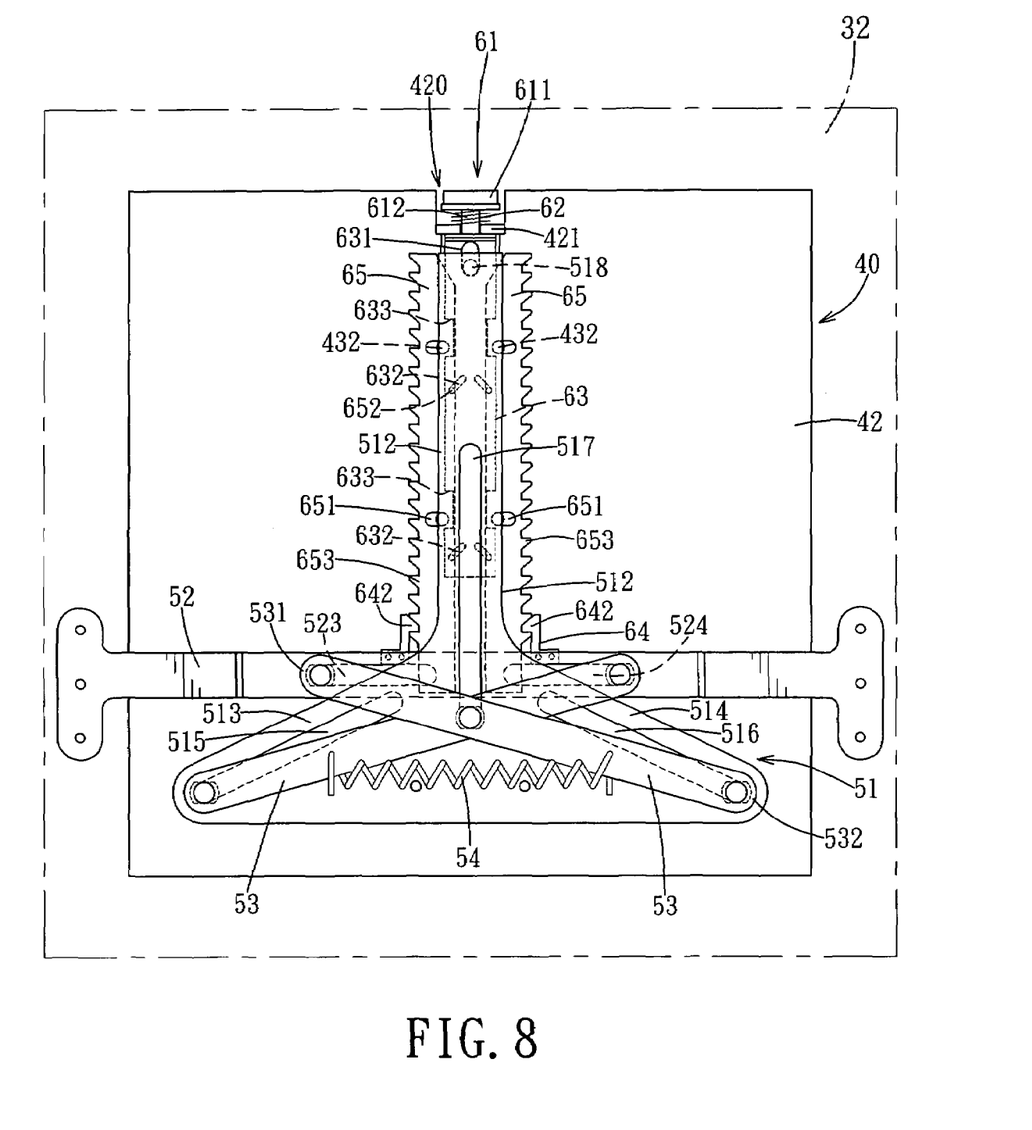
FIG. 8 is a front view to illustrate the height adjusting mechanism of the preferred embodiment in a non-elevating state.

Referring to FIGS. 6 and 8, the positioning mechanism 6 includes a press member 61, a compression spring 62, a driven plate member 63, two first positioning members 64, and two second positioning members 65. The press member 61, the driven plate member 63, the first positioning members 64, and the second positioning members 65 are all formed from plastic material.

The press member 61 includes a press portion 611 and an abutting portion 612 extending downward from the press portion 611. The press member 61 is disposed insertably in the recessed receiving portion 420 of the rear casing 40, with the abutting portion 612 thereof corresponding to the central through portion of the bottom wall 421 of the recessed receiving portion 420. The compression spring 62 abuts against the bottom wall 421 of the recessed receiving portion 420 and the press member 61. Thus, the press member 61 can be received resiliently and insertably in the recessed receiving portion 420 of the rear casing 40. When the press member 61 is depressed, the abutting portion 612 moves downward to extend through the central through portion of the bottom wall 421.

The driven plate member 63 is in the form of a longitudinally elongated plate, with a top end bending forward to form a bent plate portion 630. The driven plate member 63 has a longitudinal slot 631 proximate to a top end thereof, and two pairs of oblique guiding slots 632, with one pair being disposed substantially in the middle thereof, and the other being disposed proximate to a bottom end thereof. The oblique guiding slots 632 in each pair have top ends close to each other and bottom ends remote from each other. In addition, each of two opposite lateral edges of the driven plate member 63 is formed with two notches 633 that are spaced apart from each other in an up and down relationship. By means of the fastener 519 that is extended through the through hole 518 in the top end of the support frame 51 and through the longitudinal slot 631 in the driven plate member 63, the driven plate member 63 can be disposed to correspond to a rear face of the extension portion 512 of the support frame 51 and to correspond to the rectangular region 422 defined by the front face 42 of the rear casing 40, and is displaceable up and down within the longitudinal distance of the longitudinal slot 631. Besides, the bent plate portion 630 of the driven plate member 63 is secured screwably to a bottom end of the abutting portion 612 of the press member 61 to be movable with the press member 61. The positioning holes 432 in the two sides of the rectangular region 422 correspond respectively to the notches 633. Referring to FIG. 7, each of the first positioning members 64 has a bottom end 641 and a hook-shaped top end 642 extending upwardly from one side of the bottom end 641. The bottom end 641 is formed with two positioning pins 643. The two first positioning members 64 are disposed respectively on two sides of the extension portion 512 of the support frame 51 by means of the positioning pins 643 at the bottom end 641 which extend through and which are secured on the sliding frame 52, with the hook-shaped top ends 642 confronting each other.

Referring to FIGS. 6 and 8, the two second positioning members 65 are in the form of longitudinally elongated plates. Each of the positioning members 65 has two lateral slots 651 that are spaced apart from each other in an up and down relationship, two guiding keys 652 (see FIG. 8) that are formed on a rear face proximate to an inner lateral edge thereof and that are spaced apart from each other in an up and down relationship, and a plurality of positioning portions 653 formed on an outer lateral edge thereof in an up and down relationship. The positioning portions 653 may be a serrated structure consisting of a series of teeth or serrations. The two second positioning members 65 are spacedly interposed between the two first positioning members 64 with one on the left and one on the right, such that the lateral slots 651 correspond respectively to the positioning holes 432 in the front face 42 of the rear casing 40 to permit extension of screws through the respective lateral slots 651 into the respective positioning holes 432. It is noted that the screws do not lock the second positioning members 65 fixedly to the front face 42, but permit the second positioning members 65 to be displaceable left and right within the width of the respective lateral slots 651, and that the serrated positioning portions 653 of the two second positioning members 65 are oriented toward the hook-shaped top ends 642 of the first positioning members 64. At the same time, each of the second positioning members 65 has an inner portion partly overlapping with the extension portion 512 of the support frame 51 and the driven plate member 63, with the guiding keys 652 thereof extending respectively into the oblique guiding slots 632 in the driven plate member 63, the purpose of which will be described hereinafter.

Figure 9:
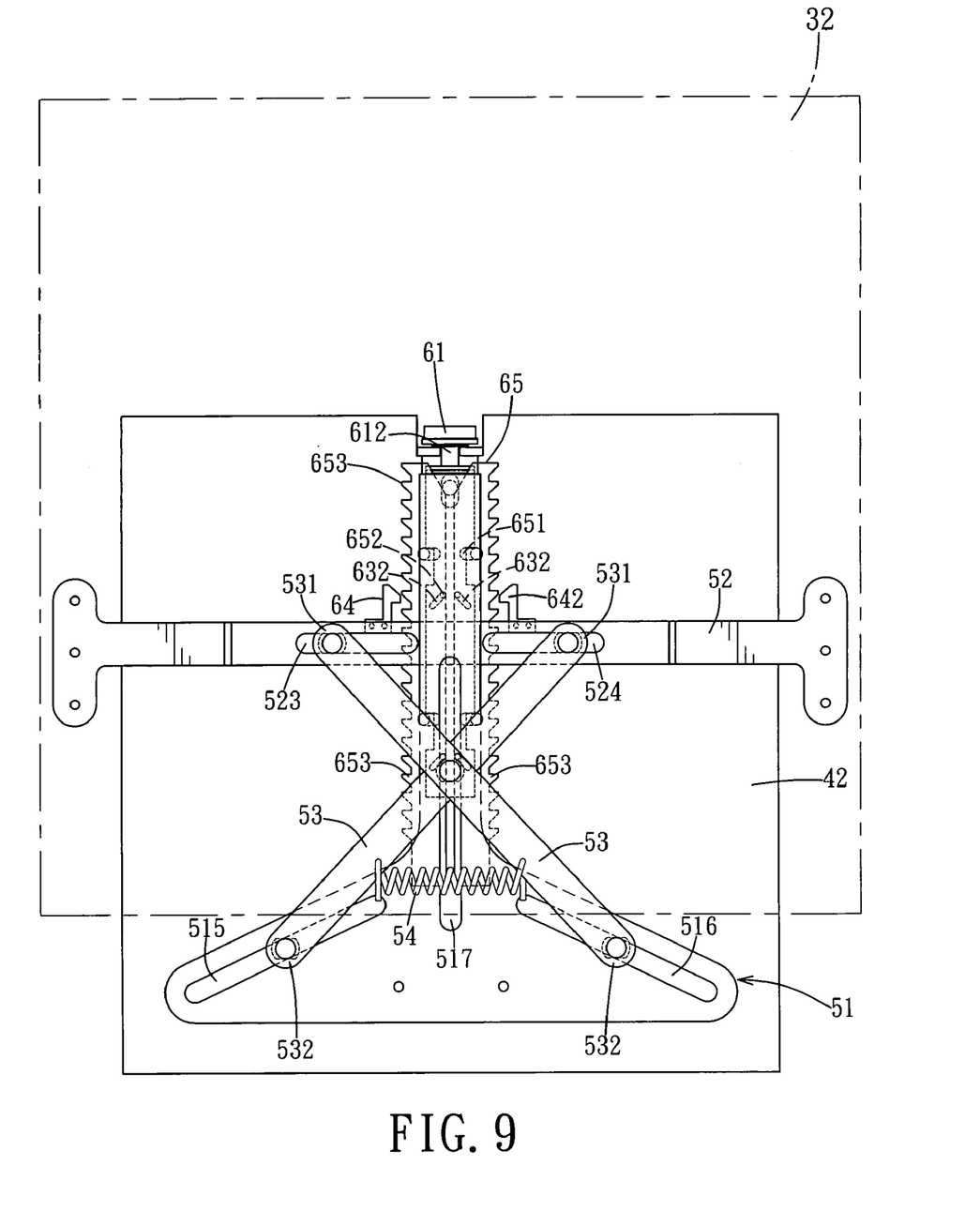
FIG. 9 is a front view to illustrate the height adjusting mechanism of the preferred embodiment in an elevating state.
Figure 10:
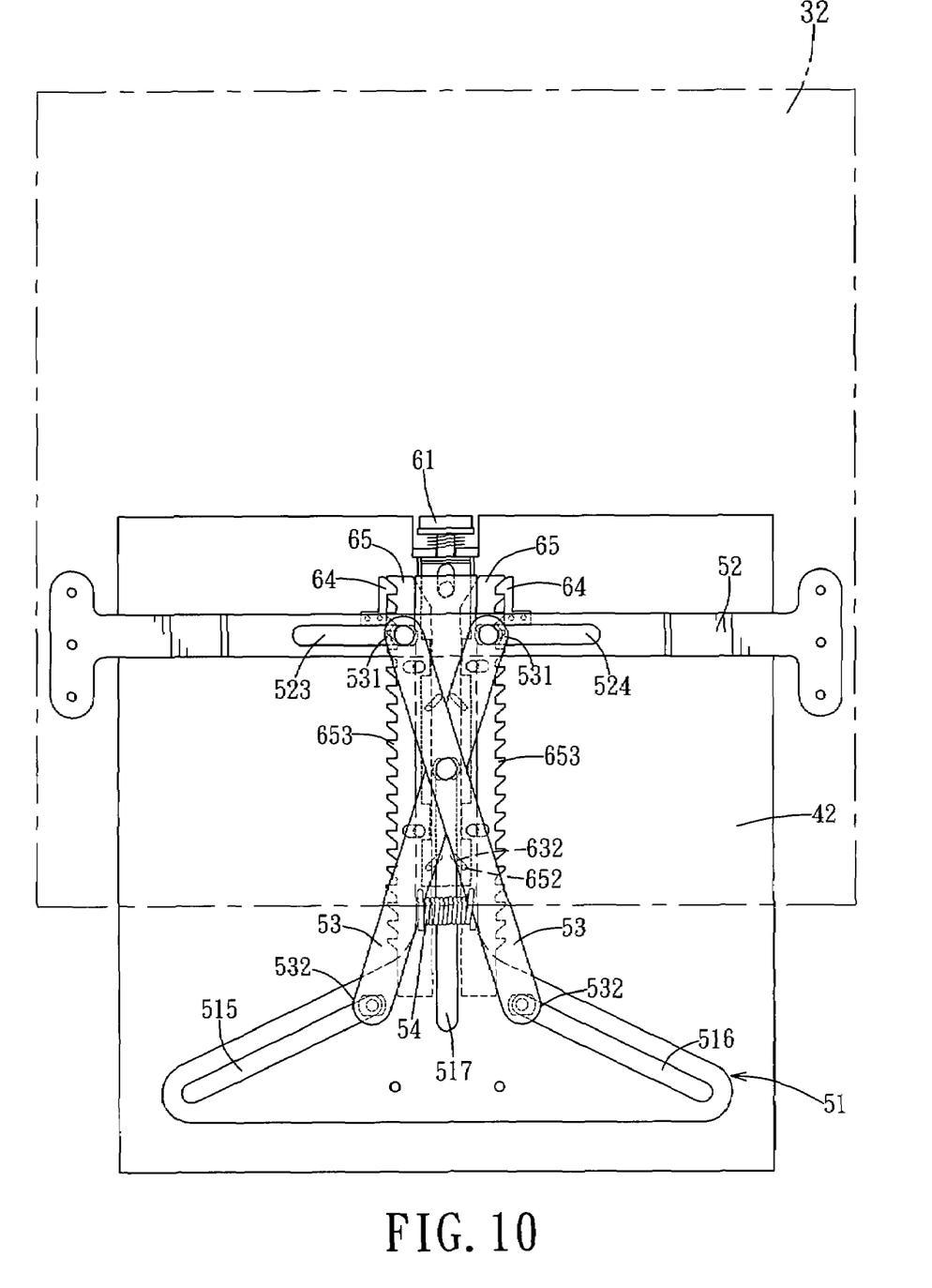
FIG. 10 is a front view to illustrate the height adjusting mechanism of the preferred embodiment in a highest elevating state.

Referring to FIGS. 8 to 10, when the display 32 of the notebook computer 3 is in a normal state of use as shown in FIG. 4, as best illustrated in FIG. 8, the top and bottom ends 531, 532 of the two sliding support members 53 are located at outer ends of the lateral slide slots 523, 524 in the sliding frame 52 and the oblique slide slots 515, 516 in the support frame 51, respectively. The sliding frame 52 is located at a bottom end of the extension portion 512. The intersection of the two sliding support members 53 is located at a bottom end of the longitudinal slide slot 517 in the support frame 51. The guiding keys 652 on the rear face of the two second positioning members 65 are located at the bottom ends of the oblique guiding slots 632, respectively. A gap is formed between the inner sides of the two second positioning members 65. The hook-shaped top ends 642 of the two first positioning members 64 respectively engage bottom ends of the serrated positioning portions 653 on the outer sides of the two second positioning members 65.

When the user intends to adjust the height of the display 32, he/she can press the press member 61 on the top portion of the rear casing 40. Through the abutting portion 612 of the press member 61 that is screwed to the driven plate member 63, the driven plate member 63 can be pushed downward, thereby causing the guiding keys 652 of the second positioning members 65 to slide into top ends of the oblique guiding slots 632, respectively. During the sliding process, since the driven plate member 63 is lowered relative to the two second positioning members 65, the guiding keys 652 are relatively raised with respect to the oblique guiding slots 632. Furthermore, since the lateral slots 651 of the two second positioning members 65 have the screws extending therethrough, the two second positioning members 65 will only displace laterally toward each other, so that the serrated positioning portions 653 are disengaged respectively from the hook-shaped top ends 642 of the two first positioning members 64. The notches 633 in the lateral edges of the driven plate member 63 are provided in such positions as to stay clear of the screws passing through the lateral slots 651 in the second positioning members 65 and the positioning holes 432 in the front face 42 of the rear casing 40 so as to allow the driven plate member 63 to displace up and down.

Thereafter, the display 32 together with the sliding frame 52 can be slid upward relative to the rear casing 40. It is noted that, as shown in FIG. 9, since the two sliding support members 53 are connected in a cross manner, and since the top and bottom ends 531, 532 of each of the sliding support members 53 are connected slidably to the respective one of the lateral slide slots 523, 524 in the sliding frame 52 and the oblique slide slots 515, 516 in the support frame 51, when the two sliding support members 53 are moved by the sliding frame 52, the inclination of each of the sliding support members 53 will increase gradually with an increase in the elevated height of the sliding frame 52. Moreover, the top ends 531 of the sliding support members 53 slide inwardly from the outer ends of the lateral slide slots 523, 524 in the sliding frame 52 toward each other, whereas the bottom ends 532 thereof slide gradually upward from the outer ends of the oblique slide slots 515, 516 in the support frame 51 toward each other. In other words, when the sliding frame 52 is elevated gradually, the two sliding support members 53 are turned pivotally toward each other such that the two top ends 531 move toward each other along the lateral slide slots 523, 524, and the two bottom ends 532 move toward each other along the oblique slide slots 515, 516. Accordingly, the sliding support members 53 can, through changing the inclinations thereof, correspond to the increase in height of the sliding frame 52. In addition, the intersection of the two sliding support members 53 is gradually slid upward along the longitudinal slide slot 517.

In this embodiment, the function of the extension spring 54 interconnecting the two sliding support members 53 resides in that, when the display 32 is brought to move upward, the two sliding support members 53 will pivot toward each other through the sliding frame 52, and the elastic restoration force of the extension spring 54 assists in pulling the two sliding support members 53 toward each other so as to elevate the sliding frame 52, thereby reducing the force that is required to be applied by the user to elevate the display 32.

As shown in FIG. 10, after the user has adjusted the display 32 to the required height (the height of the sliding frame 52 in FIG. 10, in which the top ends 531 and the bottom ends 532 of the two sliding support members 53 are respectively at the innermost ends of the lateral slide slots 523, 524 and the oblique slide slots 515, 516, is the largest adjustable height of the sliding frame 52), the press member 61 can be released so that the press member 61 pulls the driven plate member 63 upward as a result of the elastic restoration force of the compression spring 62. Consequently, the guiding keys 652 of the two second positioning members 65 slide back to the bottom ends of the oblique guiding slots 632 in the driven plate member 63, the two second positioning members 65 return to their original positions, and the two first positioning members 64 on the sliding frame 52 once again engage the serrated positioning portions 653 on the outer lateral edges of the two second positioning members 65, thereby positioning the display 32 at the adjusted height.

As disclosed in the above preferred embodiment of the present invention, by using two sliding support members 53 connected slidably the sliding frame 52 and the support frame 51, although each sliding support member 53 is a bar with a fixed length, due to the provision of the lateral slide slots 523, 524 in the sliding frame 52 and the oblique slide slots 515, 516 in the support frame 51, the horizontal distance between outermost ends of the lateral slide slot 523 and the oblique slide slot 516, and that between outermost ends of the lateral slot 524 and the oblique slide slot 515 when the sliding frame 52 is at the lowest height can accommodate the length of the sliding support members 53 to result in a small inclination of the sliding support members 53. When the sliding frame 52 slides upwardly, due to the length of the sliding support members 53, as well as the arrangement of the slide slots 515, 516, 523, 524, the sliding frame 52 can be slid beyond the top end of the longitudinal slide slot 517 in the extension portion 512, so that the height to which the sliding frame 52 can be slid to is not limited by the length of the longitudinal slide slot 517 in the extension portion 512. In other words, the two sliding support members 53 function to "augment" the longitudinal slide slot 517 in the support frame 51 to thereby increase the height to which the sliding frame 52 can be elevated.

Additionally, in this embodiment, while the lateral slide slots 523, 524 are provided in the sliding frame 52, and the oblique slide slots 515, 516 are provided in the support frame 51, they are interchangeable by modifying the shape of the sliding frame 52. Alternatively, the oblique slide slots 515, 516 in the support frame 51 can be modified into lateral slide slots or longitudinal slide slots.

In this embodiment, the display height adjusting device 4 is disposed between the computing device 31 and the display 32 to constitute the height adjusting device for a notebook computer. However, in other embodiments of the invention, the computing device 31 may be substituted by a base that does not have a computing function and that merely serves to support the face panel module 323 so as to constitute a display having the aforesaid display height adjusting device 4, the face panel module 323, and the base.

In sum, the present invention utilizes the two sliding support members 53 connected slidably to the sliding frame 52 and the support frame 51 so as to constitute the height adjusting mechanism 5. Through further cooperation of the first and second positioning members 64, 65, the present invention can achieve a display height adjusting device 4 that can be incorporated in the notebook computer 3 and that can augment the height to which the display 32 can be elevated.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A display height adjusting device adapted to be provided on a display, said display height adjusting device comprising:
   a rear casing adapted to be mounted on a rear face of the display and having a front face adapted to be spaced apart from the rear face of the display;
   a support frame disposed in front of said rear casing, said support frame having a first left side portion and a first right side portion;
   a sliding frame in the form of a plate and adapted to be disposed on the rear face of the display, said sliding frame having a second left side portion and a second right side portion; and
   two intersecting sliding support members, each of said sliding support members having a top end and a bottom end, said bottom ends of said two sliding support members being connected slidably and respectively to said first left side portion and said first right side portion, said top ends of said two sliding support members being connected slidably and respectively to said second left side portion and said second right side portion;
   said sliding frame being capable of bringing said top and bottom ends of said two sliding support members to move therewith so as to enable the display to slide up and down relative to said sliding frame and said support frame.

2. The display height adjusting device according to claim 1, further comprising a positioning mechanism, said positioning mechanism including:
   a pair of first positioning members that are spacedly disposed on said sliding frame; and a pair of second positioning members, each of which has a plurality of positioning portions that are arranged in an up and down relationship, said two second positioning members being disposed on said front face of said rear casing relative to upper portions of said first left and right side portions of said support frame, with said positioning portions thereof disposed adjacent to said first positioning members respectively, each of said second positioning members being forcible to move away from the respective one of said first positioning members;

when each of said second positioning members is adjacent to the respective one of said first positioning members, each of said first positioning members engaging one of said positioning portions of the respective one of said second positioning members at a corresponding height to thereby position said sliding frame at a desired height; when each of said second positioning members is forced to move away from the respective one of said first positioning members, said positioning portions thereof disengaging from the respective one of said first positioning members to thereby permit said sliding frame to move up and down relative to said support frame.

3. The display height adjusting device according to claim 2, wherein said positioning mechanism further includes a driven plate member that is displaceable upwardly and downwardly and that is disposed between said front face of said rear casing and said two second positioning members, two opposite sides of said driven plate member overlapping partly and respectively with said two second positioning members, said driven plate member having two symmetrical oblique guiding slots disposed respectively in portions where said driven plate member overlaps with said two second positioning members, said two oblique guiding slots having top ends proximate to each other and bottom ends remote from each other, each of said second positioning members further having a guiding key that extends into a respective one of said oblique guiding slots, said guiding keys of said two second positioning members being located respectively at the bottom ends of said two oblique guiding slots in said driven plate member when each of said first positioning members engages one of said positioning portions of the respective one of said second positioning members, said guiding keys of said two second positioning members being forced to slide respectively to the top ends of said two oblique guiding slots when said driven plate member is subjected to a force to displace downward, so that said two second positioning members are caused to move toward each other to permit disengagement of said positioning portions thereof from said first positioning members.

4. The display height adjusting device according to claim 3, wherein said positioning mechanism further includes a press member that is disposed insertably and resiliently on a top edge of said rear casing, said driven plate member being located to correspond to a lower portion of said press member and having a top end connected to said press member, said press member being pressable to push said driven plate member to displace downwardly and bring said two second positioning members to move toward each other.

5. The display height adjusting device according to claim 4, wherein said positioning mechanism further includes a fastener, said driven plate member being provided with a longitudinal slot adjacent to said top end thereof, said front face of said rear casing being formed with a positioning hole, said driven plate member being disposed on said front face of said rear casing such that said longitudinal slot corresponds to said positioning hole to permit extension of said fastener therethrough, said top and bottom ends of said longitudinal slot being brought to be proximate to said positioning hole respectively when said driven plate member displaces upward and downward.

6. The display height adjusting device according to claim 2, wherein each of said first positioning members has a bottom end and a hook-shaped top end, said hook-shaped top ends of said two first positioning members confronting each other, and said bottom ends of said two first positioning members being disposed on said sliding frame, said two second positioning members being disposed between said two first positioning members.

7. The display height adjusting device according to claim 2, wherein each of said second positioning members is in the form of an elongated plate, said positioning portions being arranged in an up and down relationship as serrations, each of said second positioning members further having two lateral slots that are spaced apart from each other in an up and down relationship, said front face of said rear casing being formed with two positioning holes corresponding in position to said lateral slots, respectively.

8. The display height adjusting device according to claim 6, wherein each of said second positioning members is in the form of an elongated plate, said positioning portions being arranged in an up and down relationship as serrations, each of said second positioning members further having two lateral slots that are spaced apart from each other in an up and down relationship, said front face of said rear casing being formed with two positioning holes corresponding in position to said lateral slots, respectively.

9. The display height adjusting device according to claim 1, wherein said sliding frame is in the form of a lateral plate with two opposite ends adapted to be secured to two opposite sides of the rear face of the display, said second left side portion and said second right side portion forming a left half section and a right half section of said lateral plate, each of said second left and right side portions having a lateral slide slot, said top ends of said two sliding support members being connected slidably and respectively to said lateral slide slots in said second left and right side portions.

10. The display height adjusting device according to claim 9, wherein each of said first left side portion and said first right side portion has an oblique slide slot, said two oblique slide slots being symmetrical and having top ends proximate to each other and bottom ends remote from each other, said bottom ends of said two sliding support members being connected slidably and respectively to said two oblique slide slots, said support frame further including an extension portion extending upwardly from a portion between said first left and right side portions, said extension portion being provided with a longitudinal slide slot, an intersection of said two sliding support members being connected pivotally to said longitudinal slot and being slidable within said longitudinal slot.

11. The display height adjusting device according to claim 1, wherein each of said first left side portion and said first right side portion has an oblique slide slot, said oblique slide slots being symmetrical and having top ends proximate to each other and bottom ends remote from each other, said bottom ends of said two sliding support members being connected slidably and respectively to said two oblique slide slots.

12. A portable computer, comprising:
a computing device;
a display; and
a display height adjusting device provided between said computing device and said display, and including:
a rear casing mounted on a rear face of said display and having a bottom portion connected pivotally to said computing device, and a front face spaced apart from said rear face of said display;

a support frame disposed in front of said rear casing, said support frame having a first left side portion and a first right side portion;

a sliding frame in the form of a plate and disposed on said rear face of said display, said sliding frame having a second left side portion and a second right side portion; and two intersecting sliding support members, each of said sliding support members having a top end and a bottom end, said bottom ends of said two sliding support members being connected slidably and respectively to said first left side portion and said first right side portion, said top ends of said two sliding support members being connected slidably and respectively to said second left side portion and said second right side portion;

said sliding frame being capable of bringing said top and bottom ends of said two sliding support members to move therewith so as to enable said display to slide up and down relative to said sliding frame and said support frame.

13. The portable computer according to claim 12, further comprising a positioning mechanism, said positioning mechanism including:

a pair of first positioning members that are spacedly disposed on said sliding frame; and a pair of second positioning members, each of which has a plurality of positioning portions that are arranged in an up and down relationship, said two second positioning members being disposed on said front face of said rear casing relative to upper portions of said first left and right side portions of said support frame, with said positioning portions thereof disposed adjacent to said first positioning members respectively, each of said second positioning members being forcible to move away from the respective one of said first positioning members;

when each of said second positioning members is adjacent to the respective one of said first positioning members, each of said first positioning members engaging one of said positioning portions of the respective one of said second positioning members at a corresponding height to thereby position said sliding frame at a desired height;

when each of said second positioning members is forced to move away from the respective one of said first positioning members, said positioning portions thereof disengaging from the respective one of said first positioning members to thereby permit said sliding frame to move up and down relative to said support frame.

14. The portable computer according to claim 12, wherein said sliding frame is in the form of a lateral plate with two opposite ends secured to two opposite sides of said rear face of said display, said second left side portion and said second right side portion forming a left half section and a right half section of said lateral plate, each of said second left and right side portions having a lateral slide slot, said top ends of said two sliding support members being connected slidably and respectively to said lateral slide slots in said second left and right side portions.

15. The portable computer according to claim 12, wherein each of said first left side portion and said first right side portion has an oblique slide slot, said two oblique slide slots being symmetrical and having top ends proximate to each other and bottom ends remote from each other, said bottom ends of said two sliding support members being connected slidably and respectively to said two oblique slide slots.

16. The portable computer according to claim 12, wherein said display includes a front panel, said front panel being disposed on said rear face of said display and being assembled to said rear casing so as to be spaced apart from said front face of said rear casing, said display height adjusting device being mounted and disposed between said front panel and said rear casing.

17. A display, comprising:

a base;

a face panel module; and a display height adjusting device disposed between said base and said face panel module, and including:

a rear casing mounted on a rear face of said face panel module and having a bottom portion connected pivotally to said base, and a front face spaced apart from said rear face of said face panel module;

a support frame and disposed in front of said rear casing, said support frame having a first left side portion and a first right side portion;

a sliding frame in the form of a plate and disposed on said rear face of said face panel module, said sliding frame having a second left side portion and a second right side portion; and two intersecting sliding support members, each of said sliding support members having a top end and a bottom end, said bottom ends of said two sliding support members being connected slidably and respectively to said first left side portion and said first right side portion, said top ends of said two sliding support members being connected slidably and respectively to said second left side portion and said second right side portion;

said sliding frame being capable of bringing said top and bottom ends of said two sliding support members to move therewith so as to enable said face panel module to slide up and down relative to said sliding frame and said support frame.

18. The display according to claim 17, further comprising a positioning mechanism, said positioning mechanism including:

a pair of first positioning members that are spacedly disposed on said sliding frame; and a pair of second positioning members, each of which has a plurality of positioning portions that are arranged in an up and down relationship, said two second positioning members being disposed on said front face of said rear casing relative to upper portions of said first left and right side portions of said support frame, with said positioning portions thereof disposed adjacent to said first positioning members respectively, each of said second positioning members being forcible to move away from the respective one of said first positioning members;

when each of said second positioning members is adjacent to the respective one of said first positioning members, each of said first positioning members engaging one of said positioning portions of the respective one of said second positioning members at a corresponding height to thereby position said sliding frame at a desired height; when each of said second positioning members is forced to move away from the respective one of said first positioning members, said positioning portions thereof disengaging from the respective one of said first positioning members to thereby permit said sliding frame to move up and down relative to said support frame.

19. The display according to claim 17, wherein said sliding frame is in the form of a lateral plate with two opposite ends secured to two opposite sides of said rear face of said face panel module, said second left side portion and said second right side portion forming a left half section and a right half section of said lateral plate, each of said second left and right side portions having a lateral slide slot, said top ends of said two sliding support members being connected slidably and respectively to said lateral slide slots in said second left and right side portions.

20. The display according to claim 17, wherein each of said first left side portion and said first right side portion has an oblique slide slot, said two oblique slots being symmetrical and having top ends proximate to each other and bottom ends remote from each other, said bottom ends of said two sliding support members being connected slidably and respectively to said two oblique slide slots.

21. The display according to claim 17, further comprising a front panel, said front panel being disposed on said rear face of said face panel module and being assembled to said rear casing so as to be spaced apart from said front face of said rear casing, said display height adjusting device being mounted and disposed between said front panel and said rear casing.

* * * * *